United States Patent Office 3,509,628
Patented May 5, 1970

3,509,628
MACHINE FOR CUTTING CHEESE
Imerio Carturan, Via Rio 14, Sossano, Vicenza, Italy
Filed July 30, 1968, Ser. No. 748,803
Claims priority, application Italy, Aug. 2, 1967,
61,598/A/67
Int. Cl. A01j 23/00
U.S. Cl. 31—25
5 Claims

ABSTRACT OF THE DISCLOSURE

A machine for cutting cheese includes a support for the cheese, a manually rotatable shaft located below the support and a cutting wire suspended centrally from another wire and having ends extending through a slit provided in the support and attached to opposite ends of the shaft.

---

This invention relates to a machine for cutting cheese and refers more particularly to a machine cutting with ease and precision pieces of cheese having a hard crust.

It is a matter of general knowledge that difficulties are encountered when cutting cheese having a hard crust, such as grained cheese, not only in stores, but also in restaurants, hotels and the like. It is usually necessary to use the sharp edge of a special knife and the cutting requires a certain amount of dexterity on the part of the user. There is the danger that an inexperienced person may cut himself.

Furthermore, it is rather difficult to produce a neat and precise cut along a predetermined line by the manual cutting now in general use.

An object of the present invention is the provision of means which cut cheese with extreme ease and precision while eliminating any danger to the operator.

Other objects of the present invention will become apparent in the course of the following specification.

In the accomplishment of the objectives of the present invention it was found desirable to provide a support for the piece of cheese to be cut, the support being provided with a central slit. A thin and strong cutting wire, made, for example, of steel or other suitable material, extends through this slit and is attached to a horizontal shaft below the supporting surface, the shaft being rotatable manually by the operator. The center of the wire is attached to another wire suspendetd from a reel located above the piece of cheese to be cut and provided with suitable supporting means as well as springs pulling the wire.

Thus the cutting wire is always tensioned and has the shape of a reversed V prior to the beginning of the cutting operation.

The invention will appear more clearly from the following detailed description when taken in connection with the accompanying drawing, showing, by way of example, a preferred embodiment of the inventive idea.

Figure 1:
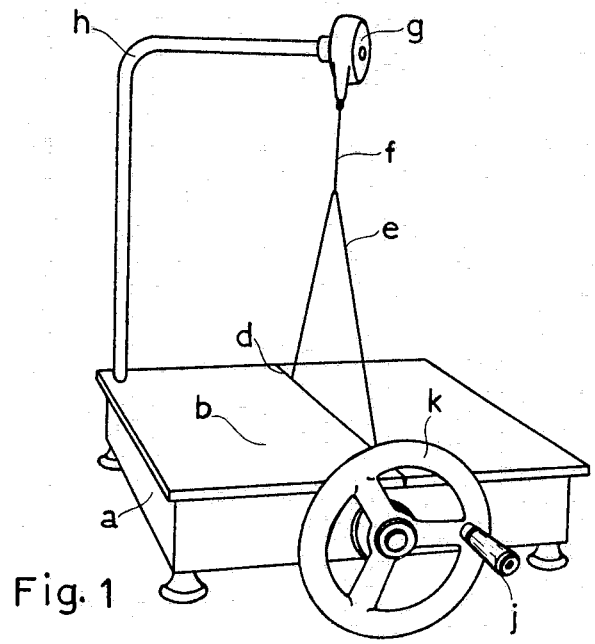
FIGURE 1 is a perspective view of a cheese cutting machine of the present invention.

The machine shown in the drawing has a base $a$ upon which is mounted a plate $b$ constituting the supporting surface for the piece $c$ of cheese to be cut. The plate $b$ has a transverse slit $d$ (FIG. 1). A cutting wire $e$ made of steel or other suitable material extends through the slit $d$ and is attached at the top to a second wire $f$ which is wound upon a reel located within a drum $g$. The drum is carried by an arm of an L-shaped support $h$. The reel is provided with a winding spring, for example, a flat spiral spring.

The wire $f$ extends through a damping device consisting of a movable tube within a larger coaxial tube with a spring between the tubes, the larger tube being connected with the drum $g$ carried by the support $h$.

Figure 2:
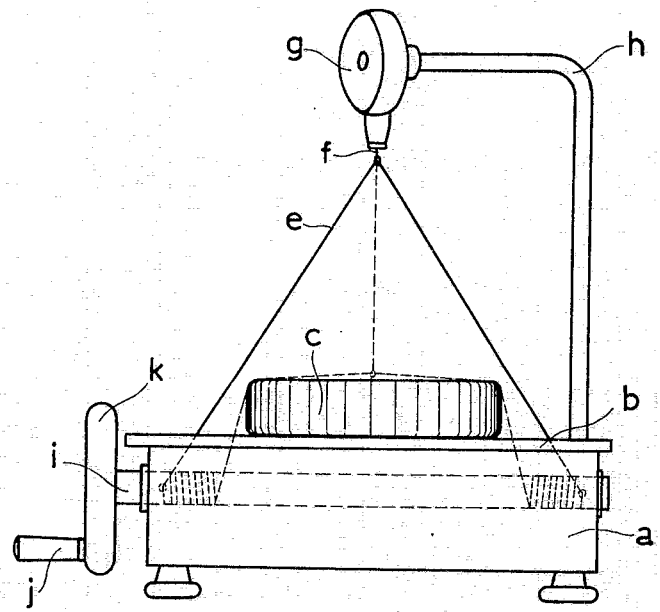
FIGURE 2 is a side view.

The two ends of the wire $e$ (FIG. 2) are wound upon opposite ends of a shaft $i$ which extends horizontally below the plate $b$. The shaft $i$ can be rotated manually by means of a handle $j$ connected to a handwheel $k$.

In operation, when the shaft $i$ is rotated by the handle $j$ the thread $e$ can be lowered, whereby it will assume initially the shape of a reversed V. Then the wire $e$ will engage the piece $c$ of the cheese to be cut and will cut it along a perfectly straight line.

This cutting operation takes place very easily, the location of the cut can be perfectly placed and all danger to the user is avoided.

Another advantage of this cutting procedure is that the cheese slices can be better preserved and placed side by side.

It is apparent that the example described above has been given only by way of illustration and not by way of limitation and that it is capable of many variations and modifications within the scope of the present invention. All such variations and modifications are to be included within the scope of the present invention.

What is claimed is:

1. A machine for cutting cheese, comprising a support having an elongated slit, a rotary shaft located below said support, a cutting wire extending through said slit and having ends wound upon opposite ends of said shaft, another wire located above said support and having an end connected to the center of the first-mentioned wire, and means resiliently supporting the other end of the second-mentioned wire.

2. A machine in accordance with claim 1, comprising a handwheel connected to an end of said shaft.

3. A machine in accordance with claim 1, wherein the first-mentioned wire is a thin and strong steel wire.

4. A machine in accordance with claim 1, wherein said means comprise a pulley and winding means connected with said pulley.

5. A machine in accordance with claim 4, wherein said winding means consist of a coiled flat spring.

References Cited

UNITED STATES PATENTS

| 1,225,602 | 5/1917 | Ericksen | 31—25 |
| 1,906,582 | 5/1933 | Gundlach | 30—116 |
| 2,936,522 | 5/1960 | Paldino et al. | 31—24 |

FOREIGN PATENTS

| 570,698 | 7/1945 | Great Britain. |
| 352 | 1/1882 | Great Britain. |

ALDRICH F. MEDBERY, Primary Examiner

U.S. Cl. X.R.

30—116